United States Patent [19]

Heppner et al.

[11] 4,027,112
[45] May 31, 1977

[54] HEAD-REST AND LOUDSPEAKER COMBINATION

[75] Inventors: Paul Heppner, Hildesheim; Gottfried Pohlmann, Wendhausen, both of Germany

[73] Assignee: Blaupunkt-Werke GmbH, Hildesheim, Germany

[22] Filed: Feb. 17, 1976

[21] Appl. No.: 658,342

[30] Foreign Application Priority Data
Mar. 20, 1975 Germany .......................... 7508842

[52] U.S. Cl. .............................. 179/146 H; 179/180
[51] Int. Cl.² .................... H04M 1/11; H04R 1/28; H04R 5/02
[58] Field of Search ................................. 179/146 H

[56] References Cited
UNITED STATES PATENTS
3,290,450 12/1966 Majoros ............................ 179/146
3,512,605 5/1970 McCorkle ................... 179/146 H X Primary Examiner—William C. Cooper
Attorney, Agent, or Firm—Flynn & Frishauf

[57] ABSTRACT

A body of foam substance forming a head-rest, for example a head restraint for an automobile seat, an aircraft seat, or the like, provides a housing and support for the loudspeaker; the forward or head-supporting surface has at least one recess, open to the front, formed therein in which the loudspeaker is located and supported. The portion of the foam material in the recess behind the loudspeaker has open pores whereas the outer or remaining surfaces of the body are essentially airtight, for example by having their pores closed or by being covered with an essentially airtight upholstering material, perforated only in the region through which the sound from the loudspeaker is to be transmitted. This arrangement permits flexible or soft membrane suspension of the loudspeaker and thus better transducing fidelity.

28 Claims, 3 Drawing Figures

HEAD-REST AND LOUDSPEAKER COMBINATION

The present invention relates to a head-rest or head restraint for vehicle seats, in combination with a loudspeaker, and more particularly for vehicle seats to be used in automobiles, aircraft, and the like, in which the head restraint or head-rest simultaneously forms a housing for a loudspeaker.

It has previously been proposed to combine loudspeakers and head-rests in order to permit users of a seat to which the head-rest is attached to listen to music or other presentations, without excessive annoyance to persons who may be nearby. Vehicles in which the passengers are forced to sit closely together, such as automobiles, aircraft, and the like, preferably permit each one of the passengers to individually decide whether they wish to listen to a particular program without annoying neighbors, or without having to make any allowance for the presence of neighbors. The loudspeaker systems used in known head-rest-loudspeaker combinations usually are of comparatively low tone quality. In home receivers, expensive high-fidelity loudspeaker systems have become customary. Such loudspeaker systems use a soft or highly elastic suspension of the loudspeaker diaphragm.

The enjoyment of transmissions of music programs, for example, received by a listener in a moving vehicle is already impaired by vehicle noises. Using loudspeakers which have a stiff membrane suspension does not satisfy the exacting requirements placed on the fidelity of reproduction, that is, on the tone quality of the received programs.

Known arrangements have been proposed in which a head-rest is formed with two recesses in the rear portion thereof. Two loudspeakers are built into the recesses. A comparatively thick layer of foam rubber is located between the loudspeakers and the support surface for the head of the listener. This foam rubber layer effects comparatively high damping of the sound transmitted to the ears of the passenger. This system has the disadvantage that the construction, open to the back, permits radiation of signals rearwardly of the head-rest which cannot be entirely suppressed. The loudspeakers used in such arrangements have a stiff suspension, that is, a diaphragm suspension of low elasticity.

It is an object of the present invention to provide a loudspeaker and head-rest combination in which persons in the vicinity of the seat to which the combination is attached are not, or at least practically not disturbed by any sound transmission from the head-rest, and which additionally provides for better fidelity of reproduction. It is especially desirable to improve the reproduction of the bass tones, and further to suppress radiation of sound rearwardly of the head-rest.

Subject Matter of the Present Invention

Briefly, the surface portion of the head-rest against which the head of the user is supported is formed with a recess in which a loudspeaker, preferably of soft suspension, is located. The head-rest is formed of foam material and the surface of the foam material facing the recess is porous; the other, or outer surfaces of the head-rest and not part of the recess, are essentially airtight, for example by forming, or being covered by an airtight skin. If an overall cover of effectively airtight material, such as plastic or the like, is placed over the foam head-rest after assembly of the loudspeaker in the recess, then the cover is preferably formed with perforations in the region of the loudspeaker only, to permit the passage of sound from the loudspeaker, while effectively sealing the remainder of the head-rest so that the head-rest itself will form a resonant chamber, radiation of sound from which, except where the loudspeaker is located, being effectively damped and suppressed.

The arrangement or structure permits greatly improved fidelity of reproduction since loudspeakers with soft, highly flexible or elastic diaphragm suspension may be used. Additionally, the frequency response of the loudspeaker is preferably controllable, for example by a tone control, as well as by mechanical filtering arrangements, so that the overall fidelity of response and tone quality is good.

The airtight outer skin or cover of a foam head-rest has the additional advantage that the customarily provided loudspeaker housings made, for example, of wood or the like, are no longer necessary. The foam material itself forming the upholstery for the head-rest simultaneously forms the damping material so that additional sound-absorbing material is no longer needed. It is, additionally, simple to integrate a volume control in the head-rest.

The invention will be described by way of example with reference to the accompanying drawings, wherein.

Figure 3:
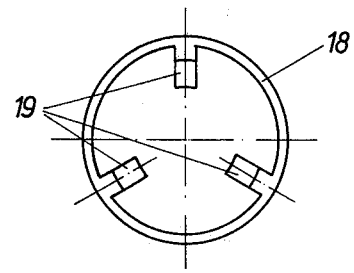

and FIG. 3 is a front view of a recess of the head-rest, with the loudspeaker removed.

The head-rest 1 (FIG. 1) is formed with two recesses 2, each one arranged to place a loudspeaker, for example for stereo reception. The material of the head-rest 1 is an open-pore foam substance 3, for example foam rubber, foamed polyurethane, or the like. The foam material 3 is sealed at the outside to provide an essentially airtight skin or sealed surface 7. To provide the sealed surface, it is also possible to use a covering upholstering material 4 (shown in chain-dotted lines in FIG. 2 for better visibility in the drawing) which may consist of customary vinyl upholstery material, artificial leather, or similar substances.

The front portion of the head-rest is shaped approximately in the form of a semi-oval, or ellipse, and subdivided in three zones. The two side zones are formed with the recesses 2. The recesses 2 extend towards the front side of the head-rest. Both the lateral or side portions, as well as the rear region of the head-rest are thick foam material, so that the sides and rear portions of the head-rest surrounding the recesses are a thick foam structure. This arrangement prevents acoustic radiation in any direction other than forwardly; radiation towards the sides and rearwardly of the head-rest is effectively absorbed by thick pads of foam material.

Loudspeakers 5, 5, each having a soft or highly elastic membrane suspension, are located in the recesses 2. The main direction or radiation from the loudspeakers is at an inclination towards the center of the oval formed by the head-rest, that is, towards the ears of a listener placing his head against the head-rest 1. Each one of the loudspeakers 5 has a cage 6 formed with an extending flange 17 and a rear flat surface. Each one of the loudspeakers 5 is secured in the recess by engagement of the respective flange 17 with a circumferential shoulder 18 (FIG. 2) of the recess 2. If desired, adhesives may be used to secure flange 17 and shoulder 18. The loudspeaker is additionally supported by ridges or ribs 19 (FIG. 3) projecting from the surface of the recess and made of the same foam material 3 as the head-rest. The ribs 19 extend from the rear portion of shoulder 18 into the inner part of the recess 2. They engage the respective loudspeaker 5 (see FIG. 2). Three ribs are suitable and preferred, although more and possibly less can be used. The rearmost portion of the ribs 19 extends into the interior of the recess 2 beyond the depth of the loudspeaker cage, so that engagement surface for the back side of the loudspeaker cage 5 will result by selective compression of the ribs upon assembly. Air spaces will form between the ribs 19 and the space defined by the surface of the recess 2 and the loudspeaker 5, which air spaces are in communication with an air chamber formed behind the rear surface of the loudspeaker cage 6 and the inner portion of the recess 2. The entire volume of the air space between the loudspeaker and the surface of the recess 2 should be as large as possible, consistent with structural strength of the entire head-rest and damping of sound radiated laterally and behind by the loudspeaker. Upon formation of the recess 2 — molded during the molding of the head-rest, care is to be taken that only those surfaces of the head-rest which, after assembly of the loudspeakers will be in front of, or beyond the shoulders 18 will be formed with outer airtight coating or skin 7. The outer airtight coating or skin can be obtained, for example, by an airtight upholstery material, or by sealing the outer surface for example with a neoprene adhesive or other sealer.

The region of the recesses 2 located rearwardly of the loudspeaker cage 6 between the ribs 19 must be so large that exchange of air from the space between the membrane and the loudspeaker cage 6 through the openings 9 in the loudspeaker cage 6 is readily possible. The foam material 3 facing the recess 2 has open pores; such air exchange may, therefore, continue within the foam material 3 itself. Further exchange of air flow is inhibited, however, at the outer limiting surfaces of the foam material 3 which is defined by the skin 7.

A chamber which is closed off airtight will form behind the speaker which, then, provides the necessary restoring force for the membrane of the loudspeaker 5. This airtight chamber is provided by the outer airtight skin covering also the rear surface of the head-rest, and so much of the foam material in advance thereof between the skin and the chamber 5 as will not provide for exchange of air flow.

The foam material 3 of the upholstery has the additional function of damping sound in the space extending rearwardly of the loudspeaker 5. The arrangement of the foam rubber material 3 with the surrounding airtight skin 7 thus forms a closed damped loudspeaker housing.

Operation

The airtight outer skin 7 and the openpore characteristics of the foam material 3 facing the recess 2 form, together, a closed damped housing for the loudspeaker of stable dimension and shape; the open-pore foam material 3 additionally functions as damping material to absorb rearwardly directed sound radiation and to suppress sound being emanated rearwardly of the head-rest.

The reset or restoring force of the closed volume within which the loudspeaker operates should not be too high, so that bass response is not impaired. In order to provide for good fidelity, the loudspeaker should have a soft, highly elastic suspension.

Elastic, soft suspension of the sound transducing system of the loudspeaker membrane-vibrating coil combination has the result that only low restoring force is required. Thus, the resonance frequency of the loudspeaker 5 will be low. In contrast to the customary loudspeakers, in which the restoring force is effectively supplied only by concentric grooves and ridges and the natural resiliency of the material of the diaphragm of the ridges, which simultaneously provides for centering of the diaphragm, the closed air volume provides linear reset or restoring force. The restoring force provided, mechanically, by the inherent resiliency of the diaphragm or membrane is usually non-linear — particularly at higher amplitudes. Providing acoustic air pressure restoring force, with soft, highly elastic suspension, results in substantially lower distortion at equal amplitude excursions of the diaphragm. Loudspeakers having a low tuning and very low resonance frequencies can thus be used; such loudspeakers necessarily require a closed damped housing or chamber. Bass response thus is substantially improved with respect to that previously obtainable, when a foam material body is used as an airtight housing, even though the physical dimensions of the loudspeaker are small, and the volume of air within the air chamber of the enclosed housing is small; these requirements are usually present in vehicle seats, for example in automotive or aircraft seats.

A mechanical tone control or tone filter is located between the loudspeaker 5 and the ear of the listener, in order to decrease the level of intermediate and higher frequencies with respect to bass reproduction.

A ring 10 of felt (FIG. 2) is located in advance of the cage 6 of the speaker, to form a spacer. A perforated sheet metal disk 11 is placed against the felt ring 10 to form a back-up support for a strip or disk 12 of open-pore, soft foam material. This strip or disk 12 is about 1 cm thick, and has a specific weight of, for example, 32 kg/m³. This soft foam material is covered at the outside by sound transmitting gauze 13. The gauze may be colored to match the color scheme of the outer upholstery. The outer cover is formed by upholstery material 4 which, in the example, is man-made leather, vinyl upholstery, or the like, formed with openings matching the holes or apertures in the disk 11.

The mechanical filter formed by the combination of the spacer ring, disk 11, and the foam material has an additional function: It forms a padded support surface to absorb mechanical shocks, for example in case of accident of the vehicle, while additionally forming an acoustic low-pass filter. The frequency response characteristics can be matched to the transducing characteristics of the loudspeaker by suitable choice of the various components of the filter — the thickness and construction of ring 10, the apertured disk 11 and the number and size of apertures, the thickness of foam disk 12, and its composition.

The low-frequency portions of the signals to be transduced are primarily damped when loudspeakers tuned for low frequencies are assembled in relatively small housings — as is the case in head-rests, for example.

Mid-range and higher frequencies are radiated relatively much better. As a result, the tone reproduction is generally more in the treble range, and characterized by an absence of bass tones. By appropriate damping of the intermediate and higher frequencies, it is possible to attenuate their transmission by means of an acoustical low-pass filter and to match the overall response to that of the transmission of low frequencies, so that the resulting received sound will be essentially uniform over a wide range of frequencies and well balanced throughout.

Figure 1:
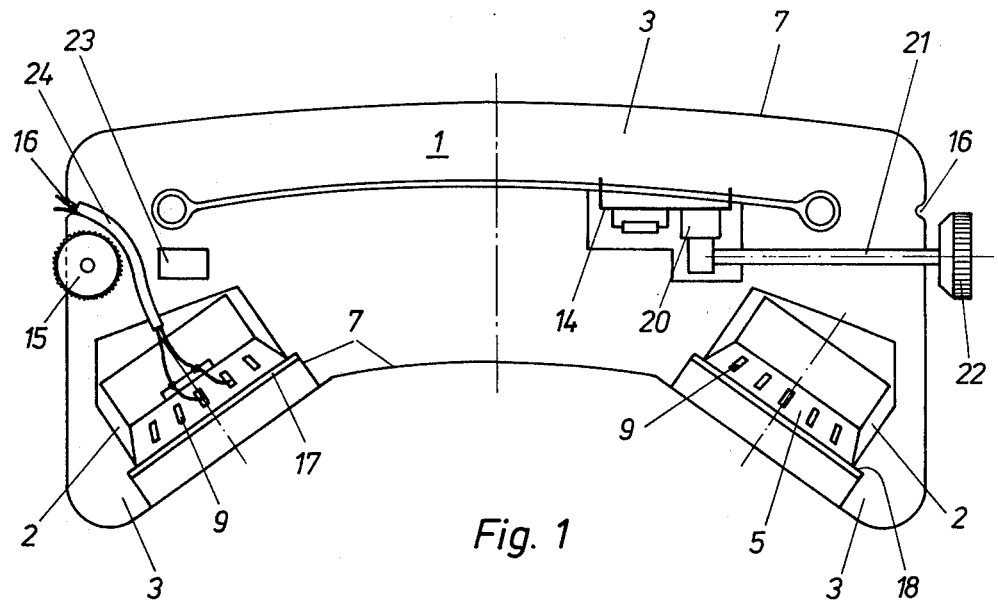
FIG. 1 is a schematic top view of a head-rest, considering that the material of the head-rest itself is transparent so that the loudspeaker structure, and additional elements are seen.
Figure 2:
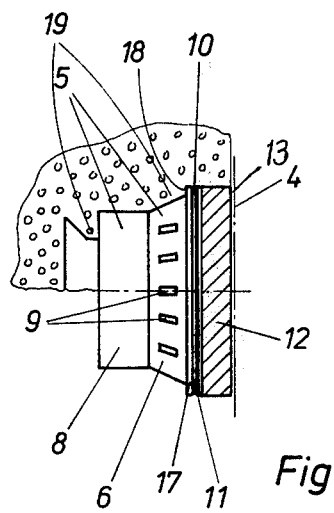
FIG. 2 is a fragmentary view of a loudspeaker in side view, illustrating its support and a mechanical sound filter.

The frequency response of the transducer system including the loudspeakers and the head-rest is additionally optimized by a passive electrical network including R, L, and C elements. It is secured to a support 14 (FIG. 1) or to a suitable chassis. The frequency response is controlled by a potentiometer 20, connected by shaft 21 with a control knob 22. The shaft 21 extends through the foam rubber material 3 of the head-rest. The support or chassis 14 is secured to a stiffening element located in the interior of the head-rest 1, the stiffening element being, for example, heavy cardboard, a somewhat flexible but still comparatively stiff plastic sheet, or the like. As seen in FIG. 1, it is formed with thickened portions at its ends (and at other locations, if desired), in order to retain its position within the foam cushion of the head-rest.

The foam cushion 3 is additionally formed at the interior with recesses or openings 23 in order to receive a volume control unit. A thumb wheel 15 made of soft plastic is fitted into the head-rest 1 in such a manner that a small portion of the outer circumference thereof extends outside of the head-rest 1, the thumb wheel 15 being coupled to a potentiometer connected in a volume control circuit for the loudspeaker or loudspeakers 5. Grooves, ducts or bores 16 are formed in the material 3 of the foam rubber in order to receive the connecting cables for the loudspeaker, the volume control, and the tone control networks. The junctions between the cables, or the cable sleeves, and the outside of the head-rest are preferably adhered together by an airtight seal, for example by adhesively securing to the outer skin 7 or the upholstery cover 4. Tubing 24 may already be molded into the material 3 of the head-rest in order to provide for conduits for the connecting cables. These tubings can be located in the head-rest as it is being foamed. The ends of the tubing 24, leading outside of the foamed material itself, should be sealed so that the foam structure is airtight with respect to the outside.

Various changes and modifications may be made within the scope of the inventive concept.

We claim:

1. Head-rest-loudspeaker combination having a body of foam substance (3) forming the head-rest and simultaneously providing a housing and support for the loudspeaker (5), said body having a head-supporting surface and a rear surface, at least one recess (2) formed in the body to receive the loudspeaker (5), wherein
the loudspeaker is a loudspeaker of soft, highly elastic diaphragm suspension, secured in the recess and forming an airtight outward closure for said recess and providing for acoustic radiation outwardly of the recess;
the recess extends into the body of foam substance (3) from the head-supporting surface, the surface of the portion of the foam material (3) defining the recess (2) behind the loudspeaker (5) being formed with open pores, to form a soft suspension, closed, damped acoustical system;
the remaining surfaces of the body being essentially airtight.

2. Combination according to claim 1, wherein the surfaces of the head-rest, except the surface of the recess, are covered with an essentially airtight skin (4, 7).

3. Combination according to claim 2, wherein the skin extends essentially entirely over the outer surfaces of the body and spans said recess to also cover the loudspeaker (5);
and said skin is perforated in the region over said loudspeaker and airtight in all other regions.

4. Combination according to claim 3, further comprising a mechanical tone filter assembly located between the diaphragm of the loudspeaker and the outer surface of the combination comprising
a spacer ring (10) adjacent the flange of the loudspeaker cage:
a disk (11) extending transversely across the loudspeaker (5) and formed with apertures matching the perforations of the skin (4, 7);
and a low-density foam pad (12) supported by said spacer ring and located in the space between the loudspeaker diaphragm and the skin.

5. Combination according to claim 4, wherein said mechanical tone filter assembly comprises a perforated disk (11) extending transversely across the loudspeaker (5) and a low density foam pad spacing said loudspeaker and said disk from the inner surface of said skin and located in a space between the loudspeaker diaphragm and the skin.

6. Combination according to claim 5, wherein the loudspeaker has an attachment flange and the recess is formed with a shoulder adjacent its end portions matching said attachment flange and forming a shoulder therefor;
and wherein the portions adjacent the recess are formed with holding ribs (19) projecting from the walls of the recess and shaped and engaged a portion of the loudspeaker extending into the recess.

7. Combination according to claim 1, wherein the portions adjacent the recess are formed with holding means (18) engaging and holding the loudspeaker.

8. Combination according to claim 7, wherein the holding means further comprise ribs (19) projecting from the walls of the recess and shaped to engage the outer circumference of the loudspeaker.

9. Combination according to claim 8, wherein the portion of the ribs (19) adjacent the inner region of the recess is formed with a projection to engage the rear portion of the loudspeaker (5) located in the recess.

10. Combination according to claim 1, wherein the recess has a volume which is larger than the volume of the loudspeaker to provide air chambers between the open pores of the material of the head-rest defining the recess and the outer circumferences of the loudspeaker.

11. Combination according to claim 1, further comprising tubing or sleeves (24) located and secured in the foam material of the body and sealed to the outside surface thereof to provide an essentially airtight connection therewith, and to permit introduction of electrical connecting wires therethrough.

12. Combination according to claim 1 wherein the surfaces of the head-rest are covered with an outer skin (4, 7);

and further comprising a mechanical tone filter assembly located between the diaphragm of the loudspeaker and the skin (4, 7).

13. Combination according to claim 1, further comprising volume control means integrated into the material of the combination and including externally accessible adjustment means.

14. Combination according to claim 13, wherein the externally accessible adjustment means project from a side surface of said combination.

15. Combination according to claim 13, wherein said externally accessible adjustment means comprises a thumb wheel (15).

16. Combination according to claim 15, wherein the axis of rotation of the thumb wheel is substantially vertical, said thumb wheel having a portion projecting from the side surface of the head-rest.

17. Combination according to claim 1, wherein said body is formed with at least one further recess to receive electronic control components electrically connected to said loudspeaker, or loudspeakers.

18. Combination according to claim 17, wherein said electronic components comprise a tone control network (20) having an externally accessible manual adjustment means (22).

19. Combination according to claim 18, wherein said externally accessible adjustment means (22) projects from a side surface of the head-rest.

20. Combination according to claim 19, further including an operating shaft (21) extending through the head-rest and connecting the manually accessible adjustment means (22) and said tone control network (20).

21. Combination according to claim 19, further comprising a volume control having externally accessible manual adjustment means (15), said volume control adjustment means being located at a side of the head-rest opposite to that of the side of which the tone control adjustment means (22) is located.

22. Combination according to claim 1, wherein the outer surface of the body is formed with grooves (16).

23. Combination according to claim 1, wherein the loudspeaker has an attachment flange and the recess is formed with a shoulder adjacent its end portions, matching said flange and forming a holding shoulder therefor.

24. Combination according to claim 23, wherein the inner portion of the recess (2) terminates flush with the shoulder (18).

25. Combination according to claim 23, wherein the inner portion of the recess (2) is relieved with respect to the shoulder (18).

26. For combination with a seat, a head-rest-loudspeaker combination
    as claimed in claim 1
    wherein the recess has a volume which is larger than the volume of the loudspeaker to provide air chambers between the open pores of the material of the headrest defining the recess and the outer circumference of the loudspeaker;
    the recess being formed with a shoulder adjacent its end portion;
    the loudspeaker has an attachment flange, the attachment flange seating against said shoulder;
    an essentially airtight skin (4, 7) covering the surfaces of the headrest, said essentially airtight skin (4, 7) spanning the recess and covering the loudspeaker (5) and being perforated in the region over the loudspeaker while being essentially airtight in all other regions;
    and a mechanical tone filter assembly located between the diaphragm of the loudspeaker and the inner surface of said skin (4, 7).

27. The head-rest-loudspeaker combination of claim 26, wherein the portions adjacent the recess are formed with holding ribs projecting from the walls of the recess and shaped to engage the outer circumference of the loudspeaker.

28. The head-rest-loudspeaker combination of claim 26, wherein the mechanical tone filter assembly comprises
    a disk extending transversely across the loudspeaker (5) and formed with apertures matching the perforations of the skin, and a low density foam pad (12) located between said disk and the inner surface of said skin.

* * * * *